United States Patent Office 2,889,278
Patented June 2, 1959

2,889,278
METHOD OF INHIBITING CORROSION OF METALS

William B. Hughes, Webster Groves, Mo., assignor to Cities Service Research and Development Company, New York, N.Y., a corporation of New Jersey No Drawing. Application March 23, 1956
Serial No. 573,351

5 Claims. (Cl. 252—8.55)

This invention relates to inhibiting corrosion of metals, and more particularly relates to an improved composition and process for the prevention of corrosion in natural gas production, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas as is generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in smaller systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, even with their use corrosion continues to such an extent as to pose a serious economic problem.

I have now discovered that corrosion of the type described above may be substantially inhibited by introducing into the production, collection and distribution lines a small but sufficient quantity of the reaction product obtained by first reacting substantially equimolar amounts of a polyethyleneamine and aldehyde, and thereafter reacting the intermediate product obtained by the reaction of the polyethyleneamine and the aldehyde with 1 to 2 mols of ethylene oxide.

The intermediate reaction product obtained by reacting the polyethyleneamine and the aldehyde, will possess the imidazolidine structure, having a side chain attached thereto, which includes a primary amine group. The further reacting of such an intermediate product with ethylene oxide has unexceptedly provided compounds of superior corrosion inhibiting properties.

In preparing the compounds, which I have found to be uniquely effective in reducing corrosion of the type described, I first react approximately 1 mol of a polyethyleneamine with 1 mol of an aldehyde under conditions which permit the removal of 1 mol of water from the reaction mixture. The reaction product, having the imidazolidine ring, hereinafter referred to as the intermediate product, is thereafter reacted with from 1 to 2 mols of ethylene oxide under conditions which affect the addition of the ethylene oxide to the imidazolidine intermediate product. This product is believed to be a product hitherto unknown. The exact nature of the linkage between the ethylene oxide and the imidazolidine ring is not clear. It has been suggested that the ethylene oxide is bonded to the nitrogen of the terminal amine group of the side chain on the imidazolidine ring. With respect to the second mol of ethylene oxide, the portion of linkage is not known, but it is doubtful that both ethylene oxide molecules are linked to a single nitrogen atom.

In preparing the intermediate product, I have found that a polyethyleneamine selected from the group comprising diethylene triamine, triethylene tetramine, and tetraethylene pentamine can be used. The aldehyde utilized in preparing the intermediate imidazolidine compound can generally be any low molecular weight aldehyde of from about 1 to about 15 carbon atoms, and may be either an aliphatic aldehyde such as formaldehyde, acetaldehyde, propionaldehyde, butyraldehyde, isobutyraldehyde, heptaldehyde, and higher aldehydes, or an aromatic aldehyde such as benzaldehyde, tolualdehyde, cinnanaldehyde, salicylaldehyde, or naphthaldehyde. In addition to the previously mentioned aliphatic and aromatic aldehydes, certain heterocyclic aldehydes can be used, through such compounds are generally not as satisfactory as the aliphatic or aromatic aldehydes mentioned.

In treating the intermediate imidazolidine compound with ethylene oxide, I have found that the reaction generally proceeds in a satisfactory manner under atmospheric conditions or under conditions of temperature and pressure slightly higher than atmospheric conditions. For example, satisfactory products are obtained when the intermediate product is treated with ethylene oxide at temperatures up to about 125° F. The products obtained are generally viscous, brown liquids or gels which are dispersible with some difficulty in both oil and water but whose solubility can be improved by the use of inert solvents such as kerosene, light hydrocarbon oils, and the like.

In order to move fully understand the nature of the new compounds of my invention, the manner in which they are prepared, and their effect in inhibiting the corrosive action of various fluids on metal surfaces, the following examples are provided:

EXAMPLE 1

To 146 grams (1.0 mol) of triethylene tetramine (TETA) 114 grams (1.0 mol) of heptaldehyde were slowly added with stirring, allowing sufficient time for each added portion of the aldehyde to react before additional aldehyde was introduced into the reaction mixture. The resulting turbid mixture was then charged to a reflux condenser equipped with a decanter-type still-head. 50 ml. of xylene were added and the mixture heated to distill the water-xylene azeotrope, with the water being trapped and xylene being continuously returned to the reaction mixture. After 3 hours of heating at a temperature to about 144° C., approximately 18 grams of water had been collected. This amount of water represents the theoretical amount of water which would be recovered during the reaction of the triethylene tetramine and the aldehyde in forming the imidazolidine ring. After the molar amount of water had been recovered, the xylene solvent was removed from the reaction zone by distillation, with the final bottoms temperature of the reaction mixture being raised to about 285° C. The resulting product was a light brown oil, having a molecular weight of 258, which is to be contrasted with the theoretical molecular weight value for this compound of 261. This intermediate product was tested as a corrosion inhibitor and is identified as inhibitor No. 1 in Table 1 which follows:

In the foregoing example it is, of course, understood that any suitable azeotrope forming solvent such as benzene, toluene or the above mentioned xylene can be used. The temperature at which the azeotropic distillation is carried out will, of course, depend on the particular solvent used. Generally, temperatures of from about 80° to 145° C. will be sufficient to remove water from the reaction zone and provide the intermediate imidazolidine compound after removal of solvent.

EXAMPLE 2

Approximately 25 grams of the intermediate product obtained in Example 1 above (0.1 mol) were dissolved in 100 ml. of isopropyl alcohol solution for about 30 minutes, with an increase in temperature being noted of from 25° C. to 34° C. At the end of the 30 minute period, no further ethylene oxide appeared to be going into the solution. The alcohol was then removed by distillation, leaving a light brown colored gel, which had a molecular weight of 345. The total recovered product weighed 34.7 grams, indicating that 9.8 grams of ethylene oxide had been added to the compound. This represents an addition of 2 mols of the oxide per mol of the ethylamine imidazolidine. This product was dispersible in oil and somewhat soluble in water. The product is itemized as inhibitor No. 2 in Table 1.

EXAMPLE 3

To 146 grams (1.0 mol) of tetraethylene tetramine (TETA), 106 grams of benzaldehyde was added. Addition of the benzaldehyde was accomplished with stirring with time allowed for reaction before the addition of further aldehyde to the tetraethylene tetramine (TETA). After complete addition of the aldehyde, the mixture was transferred to a flask provided with a reflux condenser equipped with a decanter type still-head. 50 ml. of xylene were added and the mixture heated so as to remove water from the reaction zone as a water-xylene azeotrope. Water was recovered in the still-head, with the xylene being returned to the reaction zone. After approximately 3 hours of heating, 18 grams of water had been collected, indicating the formation of the imidazolidine ring. After recovery of this theoretical amount of recoverable water, the xylene solvent was distilled from the reaction zone and the temperature raised to approximately 285° C. to insure substantially complete removal of water and closure of the imidazolidine ring. The product remaining was a light yellow liquid which was water-soluble and had a determined molecular weight of 250, which is to be compared with the theoretical molecular weight for this compound of 252. This compound, tested as a corrosion inhibitor, provided the protection indicated for inhibitor No. 3 in Table 1.

EXAMPLE 4

1.0 mol of the product obtained, according to Example 3 above, was treated with ethylene oxide in the manner described in Example 2. The total weight of recovered product indicated that 2 mols of the oxide were taken up by the intermediate imidazolidine product of Example 3. The final reaction product obtained after treatment with ethylene oxide was a viscous oil having a molecular weight of 341. This product is identified as corrosion inhibitor No. 4 in Table 1.

EXAMPLE 5

Following the procedure set forth in Example 1, an intermediate amino imidazolidine was prepared by reacting 186 grams (1.0 mol) of heptaldehyde. After removal of 1 mol of water from the reaction mixture by azeotrope distillation, an intermediate amino imidazolidine product was obtained, having a black color and an average molecular weight of 284. The theoretical molecular weight for this reaction product is 252. This intermediate product tested as a corrosion inhibitor provided the protection indicated for inhibitor No. 5 in Table 1.

EXAMPLE 6

1.0 mol of the intermediate reaction product obtained, according to Example 5 above, was treated with ethylene oxide in the manner previously described to produce a product which was dispersible in oil and slightly soluble in water. The gram weight of the final product indicated that 2 mols of ethylene oxide had been taken up. This product is identified as corrosion inhibitor No. 6 in the table which follows.

EXAMPLE 7

According to the method described in Example 1, 1 mol of diethylene triamine (DETA) was reacted with 1 mol of formaldehyde with 1 mol of water being removed from the reaction mixture to provide an intermediate product which was water soluble and had a molecular weight of 112. The theoretical molecular weight for this compound is 115. This compound tested as a corrosion inhibitor provided the results noted for inhibitor No. 9 in Table 1.

EXAMPLE 8

Following the procedure set forth in Example 2, 1.0 mol of the intermediate reaction product obtained in Example 7, was treated with ethylene oxide to provide a final reaction product which had a molecular weight of 155. The final product was dispersible in oil and soluble in water. The gram recovery of this protection indicated that 2 mols of ethylene oxide were taken up by the intermediate product. This compound was tested as a corrosion inhibitor and provided the percentage protection noted for inhibitor No. 10.

EXAMPLE 9

According to the method described in Example 1, 103 grams (1.0 mol) of diethylene triamine (DETA) was reacted with 130 grams (1.0 mol) of ethylhexaldehyde to provide an intermediate product of 215 grams having a molecular weight of 210. This intermediate product was slightly brown in color and when tested as a corrosion inhibitor, provided the percentage protection noted for inhibitor No. 13 in Table 1.

EXAMPLE 10

21.5 grams (0.1 mol) of the intermediate product of the foregoing example was tested with ethylene oxide in the manner described in Example 2. After 2 mols of ethylene oxide had been taken up, the alcohol solvent was removed from the reaction zone and the product tested as a corrosion inhibitor. This product provided the protection recorded for inhibitor No. 14 in Table 1.

The effectiveness of my new compounds in reducing the corrosion in natural gas production, collection and distribution systems may be more fully understood by reference to certain tests which I have conducted, using prepared acidic brines which substantially duplicate well conditions. The test procedure involved a measurement of the corrosive action of the hypothetical well fluid as inhibited with my new compounds described above upon weighed, cleaned and polished strips of number 18 gauge cold rolled steel measuring one-quarter inch by four inches, under conditions closely approximating conditions existing in a producing well and a comparison thereof with the results obtained by subjecting identical strips to the corrosive action of my hypothetical well fluid without inhibitor added.

The tests which I have conducted may be either of a dynamic or static type. In carrying out tests of the new compounds described herein, the dynamic method was used. In this method, an apparatus was utilized which dips the test panels alternately through two phases of the corrosive medium at a rate of three times per minute. The corrosive medium was held in a one liter three neck round bottom flask equipped with a heater, mercury sealed stirrer, a reflux condenser, and means for passing gas into the bottom of the corrosive medium. The stirrer was replaced by a glass hook adapted to carry the test strip. The test hook was driven by a small electric motor through a cam arrangement.

The hypothetical corrosive medium comprised a 5 weight percent solution of sodium chloride to which had been added 0.2 ml. of a mixture of 50 weight percent formic acid and 50 weight percent acetic acid. To this acid mixture a varying amount of kerosene was added (10 to 400 ml.) and carbon dioxide or natural gas was allowed to pass through the mixture during the test. The variation of kerosene volume allowed tests to more nearly simulate conditions existing either in a condensate well or those existing in a gas pipe line.

In carrying out the test, the corrosive medium was heated to boiling and the gas introduced. A punched, cleaned, weighed test panel was suspended on a glass hook and the dipping process started and allowed to continue for 90 minutes. At the end of this time, the test panel was removed, cleaned, dried, and weighed to give a blank loss.

The inhibitor was introduced into the corrosive medium and the test conducted on a comparative weighed test strip for an additional 90 minutes. At the end of this time, the test strip was again cleaned and weighed to give an inhibited test loss. The changes in weight of the test strips during the tests are taken as a measurement of the effectiveness of the inhibitor being used.

A percentage protection afforded by the respective compound being tested may be calculated for each inhibitor in accordance with the following formula $$\frac{L1-L2}{L1} \times 100 = \text{percent protection}$$

in which L1 is the loss in weight of the strips taken from the uninhibited test, and L2 is the loss in weight of the strips taken from the inhibited test.

Since it is important that the test strips be free of concontaminants, cleaning of the strips is an important feature of this test. Normally in cleaning, the test strip, after contact with the corrosive fluid either with or without inhibitor, is washed in kerosene, then in methanol, and finally washed with water prior to acid cleaning. The acid cleaning consists of treating the test strip in a 1 weight percent hydrochloric acid solution for a few seconds, washing with water, and thoroughly wiping with cheesecloth. The acid treatment is repeated several times until the original luster of the test strip is obtained as nearly as possible with a minimum amount of acid treating. After acid treating was completed, the strips were again washed in methanol, followed by acetone, and were then reweighed to determine the weight loss. The effectiveness of the described test method in comparing the percent protection of various inhibitors will be apparent from Table 1 which follows, in which comparative results are recorded in terms of percent protection for 50 and 100 p.p.m. of the respective commercial inhibitors listed therein.

Table 1

| Inhibitor No. | Formulations | Percent Protection | |
|---|---|---|---|
| | | 50 p.p.m. | 100 p.p.m. |
| 1 | TETA Heptaldehyde 1:1 | 29.2 | 43.6 |
| 2 | TETA Heptaldehyde Ethylene Oxide 1:1:2 | 79.0 | 83.6 |
| 3 | TETA Benzaldehyde 1:1 | 31.8 | 55.2 |
| 4 | TETA Benzaldehyde Ethylene Oxide 1:1:2 | 69.9 | 89.3 |
| 5 | TEPA Heptaldehyde 1:1 | 20.1 | 42.8 |
| 6 | TEPA Heptaldehyde Ethylene Oxide 1:1:2 | 70.1 | 88.1 |
| 7 | TEPA Benzaldehyde 1:1 | 41.3 | 69.4 |
| 8 | TEPA Benzaldehyde Ethylene Oxide 1:1:2 | 81.8 | 90.3 |
| 9 | DETA HCHO 1:1 | 26.4 | 54.2 |
| 10 | DETA HCHO Ethylene Oxide 1:1:2 | 31.4 | 79.1 |
| 11 | DETA Benzaldehyde 1:1 | 28.9 | 49.6 |
| 12 | DETA Benzaldehyde Ethylene Oxide 1:1:2 | 33.7 | 82.9 |
| 13 | DETA Ethylhexaldehyde 1:1 | 22.1 | 63.9 |
| 14 | DETA Ethylhexaldehyde Ethylene Oxide 1:1:2 | 46.8 | 80.3 |

TETA—triethylene tetramine.
TEPA—tetraethylene pentamine.
DETA—diethylene triamine.

It will be evident from the foregoing table that the new compounds of my invention in which ethylene oxide is added to the imidazolidine structures provided vastly superior protection of the imidazolidine compounds not so modified. For example, it will be noted, with respect to inhibitor No. 1, that the protection provided with 50 parts per million was 29.2 percent whereas inhibitor No. 2 representing the compound 1 with ethylene oxide added provided 79.0 percent protection when used under the same conditions and in the same amount. In every other case recorded, the same result was obtained, thus proving that the addition of 2 mols of the ethylene oxide provide protection against corrosion not available by the ordinary imidazolidine ring.

From the foregoing table, it will be noted that corrosion may be effectively reduced to a value of one-tenth or less of that due to the natural flow of corrosive fluids through well tubing and pipe lines by incorporating in the fluids passing through this equipment, a comparatively small amount of the new and improved compounds of my invention.

While the tests were conducted with amounts of inhibitor varying from 50 to 100 p.p.m. for comparison purposes, more or less inhibitor may be used in field work including as much as 200 or 5000 parts per million, depending on the corrosiveness of the aqueous phase present in the well, pipe lines, tanks and associated equipment. In actual use in the field, the concentration of inhibitor must, of course, be adjusted to the particular conditions existing therein provided only that the inhibitor is introduced in an amount sufficient to substantially inhibit corrosion.

I have found that generally satisfactory results can be obtained by dissolving or dispersing the inhibitor in an appropriate amount of water in order to better control the amount of inhibitor used. The inhibitor is introduced into the fluids in the well or transfer line as near to the well head as possible for treatment of the well in particular or as near to the well head as possible when it is desired to protect the transfer line. The gas current flowing through the lines is then effective in mixing the inhibitor with the corrosive fluids and will sweep the inhibitor throughout the system, affording protection to all metal equipment with which it comes in contact after the point of injection.

It is to be understood that the improved compositions of my invention are not limited to use alone and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. The method of protecting ferrous metal surfaces exposed to corrosive fluids containing varying amounts of hydrogen sulfide, carbon dioxide and other acidic materials, which comprises introducing into the corrosive fluid a quantity, small but sufficient in amount to substantially inhibit corrosion, of a product prepared by first heating together 1 mol of a polyethyleneamine selected from the group consisting of diethylene triamine, triethylene tetramine and tetraethylene pentamine with 1 mol of an aldehyde having from 1 to about 15 carbon atoms under reflux so as to remove from the reactant mixture 1 mol of water by azeotropic distillation, thereby effecting formation of the imidazolidine ring and treating the imidazolidine ring compound under conditions which effect oxyethylation with from 1 to 2 mols of ethylene oxide to provide the desired final reaction product, and passing the corrosive fluid containing the final product in contact with the metal to be protected.

2. The method of protecting ferrous metal surfaces exposed to corrosive fluids containing varying amounts of hydrogen sulfide, carbon dioxide and other acidic materials, which comprises introducing into the corrosive fluid a small quantity of a product prepared by first heating together 1 mol of a polyethyleneamine selected from the group consisting of diethylene triamine, triethylene tetramine and tetraethylene pentamine with 1 mol of an aldehyde having from 1 to about 15 carbon atoms under reflux so as to remove from the reactant mixture 1 mol of water by azeotropic distillation, thereby forming an intermediate product having an imidazolidine ring, and treating the intermediate imidazolidine ring containing product under conditions which effect oxyethylation with from 1 to 2 mols of ethylene oxide to provide a final reaction product which, after introduction into the corrosive fluid, is passed in contact with the metal surface to be protected.

3. The method of protecting ferrous metal surfaces, as claimed in claim 2, wherein the polyethyleneamine is diethylene triamine.

4. The method of protecting ferrous metal surfaces, as claimed in claim 2, wherein the polyethyleneamine is triethylene tetramine.

5. The method of protecting ferrous metal surfaces, as claimed in claim 2, wherein the polyethyleneamine is tetraethylene pentamine.

References Cited in the file of this patent

UNITED STATES PATENTS

| | | |
|---|---|---|
| 2,468,163 | Blair et al. | Apr. 26, 1949 |
| 2,520,102 | Tyron | Aug. 22, 1950 |
| 2,531,829 | Seymour | Nov. 28, 1950 |
| 2,643,977 | Hughes | June 30, 1953 |
| 2,646,399 | Hughes | July 21, 1953 |
| 2,713,582 | Smith | July 19, 1955 |
| 2,724,695 | Hughes | Nov. 22, 1955 |
| 2,745,809 | Cardwell et al. | May 15, 1956 |
| 2,819,284 | Shen | Jan. 7, 1958 |

UNITED STATES PATENT OFFICE

CERTIFICATE OF CORRECTION

Patent No. 2,889,278 June 2, 1959

William B. Hughes

It is hereby certified that error appears in the printed specification of the above numbered patent requiring correction and that the said Letters Patent should read as corrected below.

Column 1, line 55, for "unexceptedly" read -- unexpectedly --; column 2, line 34, for "move" read -- more --; line 52, for "to about" read -- of about --; column 3, line 15, for "9.8 grams" read -- 8.9 grams --.

Signed and sealed this 6th day of October 1959.

(SEAL)
Attest:

KARL H. AXLINE

Attesting Officer

ROBERT C. WATSON

Commissioner of Patents